3,102,216
METALLIZED CAPACITOR
George P. McGraw, Jr., Downers Grove, Ill., assignor to Western Electric Company, Incorporated, New York, N.Y., a corporation of New York
Filed Dec. 23, 1959, Ser. No. 861,664
1 Claim. (Cl. 317—242)

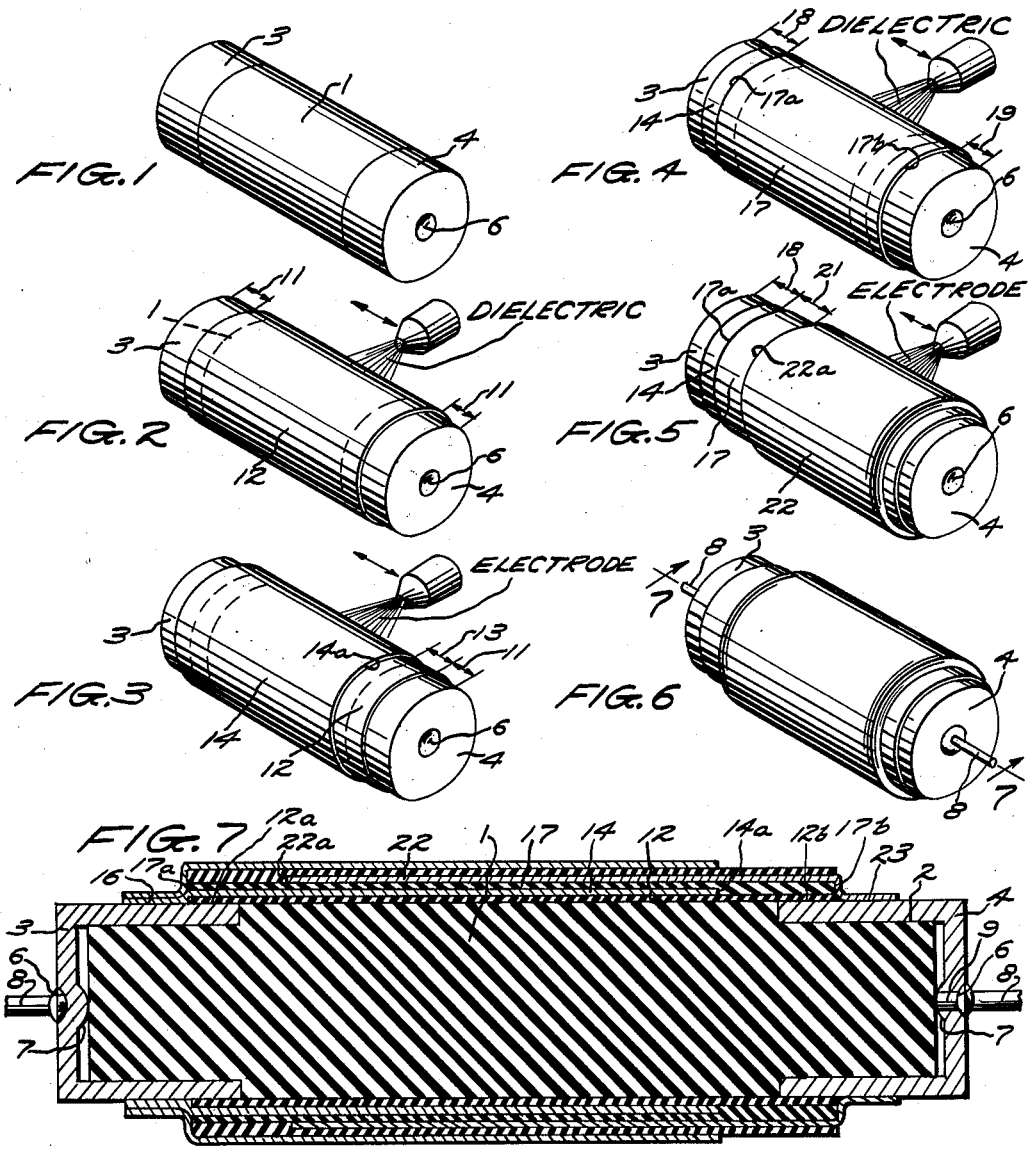

This invention relates to capacitors and more particularly to a new and improved capacitor of the metallized type.

In the manufacturing of one form of metallized capacitor presently in use, rolls of plastic film are coated with a thin layer of metal by the vapor deposition process. The film rolls are placed in a vacuum chamber and subjected to a metal vapor as they are wound from one shaft onto a second shaft, the vapor depositing onto the film in a layer on the order of 0.000003 (three millionths) of an inch in thickness. Portions of the film are shielded as it passes through the vapor so as to form clear uncoated strips extending in a longitudinal direction thereof spaced approximately three inches apart. A pair of coated film rolls are then wound together on a suitable machine around a shaft in the form of a cylinder, with the uncoated strips of each roll approximately centered between respective material coated portions on the other roll. After a preselected length of the pair of film rolls has been wound together, the film is cut transversely of its length and the formed cylinder of alternate layers of metal and film is removed from the shaft and severed along each clear strip to form short cylinders on the order of one and one-half inches in length. Leads are soldered or otherwise secured to the ends of each of these short cylinders and the cylinder is impregnated with wax or other suitable dielectric material from either end to fill the voids between the film layers and the void in the center of the cylinder caused by removal thereof from the winding shaft. The device is then encapsulated and ready for use.

The above-described type of metallized capacitor has certain advantages over the well-known capacitors formed of mica sheets separated by layers of metal electrode. Among these advantages are that it is of a smaller size for a given capacitance and it has the property of "self healing," that is, when a short circuit develops through the dielectric material the short circuit does not cause carbon deposits which eventually cause failure of the capacitor, but the thin metal coating in the vicinity of the short circuit is melted away by the heat induced by the short circuit and eventually the short circuit is eliminated. The manufacture of a capacitor made in the above manner however, requires a great number of tedious manual operations and therefore the capacitors cannot readily be made in large numbers by automatic processes. Further, since the capacitance of a capacitor will vary according to the thickness and/or the amount of air spaces and wax impregnant between its electrodes, the actual capacitance that the finished capacitor will have cannot be determined until after it has been impregnated in the last stage of its manufacture, when it can be tested in its final form.

An object of this invention is to provide a new and improved metallized capacitor.

A further object of this invention is to provide a new and improved metallized capacitor which can be more readily manufactured in large numbers at less cost by automated processes than can other known types of capacitors.

Another object of this invention is to provide a new and improved metallized capacitor which is smaller in size for a given capacitance and more stable electrically under varying ambient conditions and frequency than other known types of metallized capacitors.

A still further object of this invention is to provide a new and improved metallized capacitor in which the dielectric material is more stable under changes in temperature than other known types of metallized capacitors.

A further object of this invention is to provide a new and improved metallized capacitor in which layers of dielectric material and metal electrode are uniformly coated onto a central core member.

Another object of this invention is to provide a metallized capacitor having the property of "self healing" wherein the capacitor may be constructed to a preselected precise capacitance.

With these and other objects in view, the present invention contemplates a metallized capacitor comprising a dielectric core member having metal caps secured to each end thereof to serve as electrical terminals. As the core member is turned or rotated alternate layers of dielectric material and layers of metal are coated thereon to form bands around the periphery of the core member. The first coating is preferably of dielectric material and is applied on the core member so as to extend onto portions of the metal caps, with the second coating being of metal and applied to contact one metal cap but to be insulated from the other. Another layer of dielectric material is then applied over the coating of metal, and another layer of metal is applied over this latter layer of dielectric material so as to contact the other metal cap but to be insulated from the one metal cap. This process is repeated until the desired capacitance is obtained and the capacitor is then provided with lead wires and encapsulated in a conventional manner.

Other objects, advantages and novel aspects of the invention will become apparent upon consideration of the following detailed description in conjunction with the accompanying drawings wherein:

FIG. 1 is an isometric view of a core member having metal end caps to be used in constructing the capacitor of the invention;

FIGS. 2, 3, 4 and 5 are isometric views showing the steps by which the alternate layers of dielectric material and metal are applied to the core member shown in FIG. 1;

FIG. 6 is an isometric view of a capacitor with lead wires attached and ready to be encapsulated;

FIG. 7 is a cross-sectional view of the capacitor shown in FIG. 6 taken along the line 7—7;

FIG. 8 is a partial cross-sectional view at one end of a modified form of capacitor constructed according to the present invention; and FIG. 9 is an end view of the capacitor shown in FIG. 8.

As shown in FIGS. 1 and 7, one form of capacitor constructed according to the present invention comprises a core member 1 in the form of a cylinder and of either ceramic, plastic or fibre material. In this respect, while the core member 1 has been illustrated in the preferred form of a concentric cylinder, it is to be understood that other shape core members, as for example, an elongated rod or flat plate of either square or rectangular cross-section may be used. The ends of the core member are necked down as at 2 to receive metal caps 3, 4, the caps being secured to the core member by a press fit, cement, rivets or staking method.

Each of the caps 3, 4, is provided with an indentation 6 in the center thereof which in turn provides a protuberance 7 on the interior of the cap. The protuberance 7 engages the end of the core member 1 and acts as a bearing surface for seating the cap on the core member. The indentations 6 further provide seats for the leads 8 which are to be subsequently secured to the caps, as well as a means for receiving centering pins to hold the core member secured on center during the manufacturing process, if such is desired.

One of the end caps 3, 4, is provided with a small hole 9 through the cap at the center of the cap indentation 6. The hole 9 provides a means for identifying the polarity of the capacitor whereby the capacitor can be properly oriented and the proper end portions thereof shielded when applying the layers of dielectric material and metal in the subsequent stages of manufacture.

FIGS. 2–7 illustrate how the capacitor of the present invention is built up by the application of alternate layers of dielectric material and metal to the core member 1. The core member is preferably supported between two rotating cup members (not shown) which extend onto the ends thereof at 11 (FIG. 2) so as to act as shields for portions of the caps 3, 4. As the core is rotated, a band 12 of dielectric coating material is applied thereto so as to surround or encircle the same and extend onto the unshielded portions of the metal caps 3, 4 as shown at 12a and 12b in FIG. 7. Thus, the band 12 of dielectric coating material provides a layer of insulation between a first metal electrode layer 14 (subsequently to be described) and the dielectric core member 1, and tends to reduce the amount of leakage between the electrode layer and the metal cap 4 due to impurities (conductive material) in the core member. The dielectric coating material may be lacquer, rubber or any plastic which has been refined to the required degree of purity, and is applied to the dielectric core member 1 by any conventional spraying, roll coating, painting or dipping method.

After the first coating of dielectric material has been dried or cured, the cap 4 and a portion of the dielectric material 12 adjacent the cap are suitably shielded as at 11 and 13, respectively, as shown in FIG. 3. The metal electrode layer 14 is then applied over the dielectric layer so as to surround or encircle the same, such as by the vapor deposition process as the core member 1 is turned in a rotating container mounted in a vacuum chamber. As a result of the shielding at 11 and 13, the metallized layer 14 will contact the cap 3 at 16 but terminate adjacent the cap 4 at 14a, both as shown in FIG. 7.

To apply the second coating of dielectric material, the core member may again be supported between the two rotating cup members (not shown) with the cup members shielding the ends of the core member at 18 and 19 as shown in FIG. 4, for the same inward extent as the caps 3 and 4 were shielded at 11 in applying the first dielectric coating 12. Consequently, the dielectric coating 17 terminates at 17a and 17b (FIG. 7) and extends along the core member 1 over the same axial distance as does the dielectric coating 12.

After the dielectric coating 17 is cured or dried, a portion of the metal cap 3 and the end of the dielectric layer 17 adjacent said metal cap are suitably shielded as at 18 and 21 (FIG. 5), respectively, and a second layer 22 of metal is applied by the vapor deposition process as was the first metal layer 14, but extending onto the metal cap 4 at 23 (FIG. 7) and terminating at 22a (FIG. 7) as a result of the shielding 18 and 21.

The foregoing process is repeated until the desired capacitance is reached, whereupon the leads 8 may be attached (welded, soldered, riveted or staked) to the caps 3, 4 and the capacitor may then encased in the usual manner using lacquer, thermo-setting resin, metal cans, glass or paper tubes, or other suitable means.

FIGS. 8 and 9 show a modified form of a capacitor in which the core member 1 is not necked down as at 2 (FIG. 7) to receive the metal end caps 3, 4, but the alternate layers of dielectric material and metal electrode are applied directly to the dielectric core member as described above with regard to FIGS. 1–7, after which a multi-sided cap 24, having a lead 26 integral therewith, is press fitted to each end of the core member. The straight sides 27 of the cap engage the outer electrode layer on the core member as at 28 and thereby provide a tight fit for the cap on the core member. The head 26 passes through an aperture 29 in the cap and has a head 31 suitably secured to the interior of the cap whereby the lead and the cap form an integral unit. An indentation 32 and a small hole 33, corresponding, respectively, to the indentations 6 in the caps 3, 4 and the hole 9 in the cap 4 in FIGS. 1–7, may be formed in one end of the coremember, if desired.

In constructing a capacitor according to the present invention the layers of metal are deposited to have a thickness of approximately 0.000003 (three millionths) of an inch, since if the thickness thereof is increased appreciably above this amount, the capacitor may lose some of its property of "self healing."

The thickness to which the dielectric layers are applied will vary depending upon the voltages involved. For example, the thickness of dielectric may be 0.00010 of an inch for a 50 volt voltage, 0.00025 of an inch for a 150 voltage, and 0.00050 of an inch for a 300 volt voltage.

The capacitance that a capacitor constructed according to the present invention will have may be computed to a greater accuracy by conventional formulas than in the case of other conventional metallized capacitors which require impregnation in their manufacture, since air spaces between the electrode and dielectric layers are eliminated and the thickness of the dielectric material may more readily be controlled during the manufacturing process. In the same respect, the capacitance of capacitors having the same core dimensions and the same number of electrode layers will be more consistent. For example, a capacitor having a core one eighth of an inch in diameter and one half of an inch in length, with a thickness of the dielectric layers of approximately 0.00025 of an inch, will have a capacitance of approximately 0.0001 microfarad for each pair of metal electrodes of opposed polarity.

Constructing a capacitor in the above manner further provides a device having intimate and integral contact between the lead caps and the metal electrode, making the capacitor especially suitable for use at near zero voltages where conventional capacitors will not operate satisfactorily because of the poor contact between their leads and electrodes.

It is to be understood that the above-described arrangements are simply illustrative of the application of the principles of this invention. Numerous other arrangements may be readily devised by those skilled in the art which will embody the principles of this invention and fall within the spirit and scope thereof.

What is claimed is:

A metallized capacitor comprising, a concentric cylindrical dielectric core member, a metal cap secured to each end of said core member, a first coating of dielectric material encircling the peripheral surface of said core member and portions of said metal caps and having a pair of spaced peripheral edges, a first coating of metal electrode encircling said first coating of dielectric material, said first coating of metal electrode terminating axially inward from one of said peripheral edges of said first coating of dielectric material and extending axially beyond the other of said peripheral edges into encircling engagement with one of said metal caps, said first coating of dielectric material insulating a substantial portion of said first coating of metal electrode from said dielectric core member to reduce current leakage through said core member between said first coating of metal electrode and the other of said metal caps, a second coating of dielectric material encircling said first coating of metal electrode and extending axially toward the ends of said core member in encircling relationship with respect to portions of said metal caps, and a second coating of metal electrode encircling said second coating of dielectric material, said second coating of metal electrode extending axially into encircling engagement with the other of said metal caps and being insulated from said one of said metal caps and said first coating of metal electrode by said coatings of dielectric material, said coatings of dielectric material, and metal electrode each forming a continuous closed band.

References Cited in the file of this patent

UNITED STATES PATENTS

| | | |
|---|---|---|
| 1,900,093 | Blake et al. | Mar. 7, 1933 |
| 2,531,389 | Brandt | Nov. 28, 1950 |

FOREIGN PATENTS

| | | |
|---|---|---|
| 1,136,469 | France | Dec. 29, 1956 |